United States Patent [19]
Blodgett et al.

[11] Patent Number: 5,718,423
[45] Date of Patent: Feb. 17, 1998

[54] CASE TRIMMER

[75] Inventors: Fred Benjamin Blodgett, Chico; Jerry Dean Brand, Oroville; Steven Jerald Koch, Oroville; Ronald Leroy Smith, Oroville, all of Calif.

[73] Assignee: Blount, Inc., Montgomery, Ala.

[21] Appl. No.: 363,359

[22] Filed: Dec. 23, 1994

Related U.S. Application Data

[62] Division of Ser. No. 249,900, May 26, 1994, Pat. No. 5,497,539.
[51] Int. Cl.$^6$ ............................................. B25B 1/20
[52] U.S. Cl. ............................... 269/254 R; 408/103
[58] Field of Search ................................ 29/1.32; 408/112, 408/129, 136, 103, 108; 269/254 CS, 254 R

[56] References Cited

U.S. PATENT DOCUMENTS

2,406,170   8/1946   Smiley ..................................... 29/1.32

Primary Examiner—Joseph M. Gorski
Attorney, Agent, or Firm—Klarquist Sparkman Campbell Leigh & Whinston, LLP

[57] ABSTRACT

A motorized case trimmer is disclosed having a lever operated case holder and a motor driven trimming blade. The motor and blade are slidably mounted upon rails for quick and easy movement to provide sufficient clearance for loading a case into the case holder. A motor handle further simplifies the movement of the blade and motor whereby a simple one-step motion of the handle moves the blade and motor and locks them into a retracted position. Releasing the motor handle, permits the motor and blade to slide freely along the rails under urging by a pair of springs. The components of the case trimmer are mounted upon an elongate platform that permits adjustability of the position of the components for accommodating various size cases and for adjusting the cutting force of the blade against the cartridge case.

12 Claims, 7 Drawing Sheets

CASE TRIMMER

This is a division of application Ser. No. 08/249,900, filed May 26, 1994 and now U.S. Pat. No. 5,497,539.

BACKGROUND OF THE INVENTION

1. Field of the Invention

This invention pertains generally to the art of reloading rifle and gun cartridges, and more particular relates to the art of trimming the length of cartridge cases to prepare them for the reloading operation.

2. Description or the Related Art

When a bullet is fired from a cartridge or resized during reloading, the cartridge case expands radially and longitudinally. Thus, during subsequent reloading of a cartridge case it is necessary to resize it so that a-bullet may be properly seated and so that the reloaded cartridge will freely and fully enter the chamber of a rifle or gun. Special dies and jigs are used for resizing the radial dimensions of the case. Case trimmers are used to trim cartridge cases to their proper length.

Prior art case trimmers generally provide a collet for grabbing a rim, or head, of the cartridge case. Typically, the collet is tightened onto the case by a threaded hand crank which pulls the collet into a reducing diameter chamber, thus closing the collet onto the case. Prior art case trimmers also have a cutting blade mounted on a shaft that is slidable through a fixed collar. With the case and blade shaft aligned along a longitudinal direction, the blade is set against a mouth of the case and rotated by a hand crank to precisely and evenly trim the case to a predetermined length. An adjustable collar may be used as a jig so that it is only necessary for the operator to turn the blade against the case in a rotating manner until the adjustable collar abuts against a stop thereby preventing further cutting of the blade against the case when the proper length is achieved.

Prior art case trimmers require several turns of the collet adjustment screw to lock a case in position and require many rotations of the blade to properly trim the case to length. Often, bullet reloaders will reload hundreds of cartridges in one session which can make the repetitive task of tightening the collet onto the case and cranking the blade against the mouth of the case very time consuming and tedious. Thus, there is a need in the industry to provide a case trimmer in which the case is easily loaded into the case trimmer and the cutting operation is simplified without loss of precision or adjustability.

SUMMARY OF THE INVENTION

The above-identified problems are solved by the present invention by providing a case trimmer that can receive cases by simply actuating a lever, sliding a case into the holder and then releasing the lever. In addition, the present invention provides for a motorized cutting blade that is directly coupled to a motor that is mounted on a pair of rails for simplified adjustability and quick setup without any loss of precision in the trimming operation.

The present invention replaces the collet used in the prior art with a case holder having a spring-loaded receptacle for receiving the head of a cartridge case. The receptacle is moveable by a lever which moves the receptacle outward away from an abutment so that the head of the case can slide into the receptacle. By releasing the lever, springs urge the receptacle back against the abutment thereby holding the case.

The trimming operation is accomplished by a trimming blade that is rotated by a motor. The motor and blade are slidable along a longitudinal direction so that in one instance the motor and blade are pressing against a mouth of the case for trimming and in another instance the motor and cutting blade are locked in a location away from the case so that cases may be easily removed and inserted into the case holder without interference from the blade.

The motor is preferably mounted on a pair of rails wherein springs urge the motor along the longitudinal direction towards the case holder. An operating handle is used to push the motor against the springs and away from the case holder. The trimming blade and the motor are connected by a rod that passes through a fixed collar which is fixedly mounted to a base thereby supporting the blade for accurate cutting. The rod slides longitudinally and rotates freely in the fixed collar.

The foregoing and additional features and advantages of the present invention will be more readily apparent from the following detailed description, which proceeds with reference to the accompanying drawings.

DETAILED DESCRIPTION OF THE PREFERRED EMBODIMENTS

Figure 1:
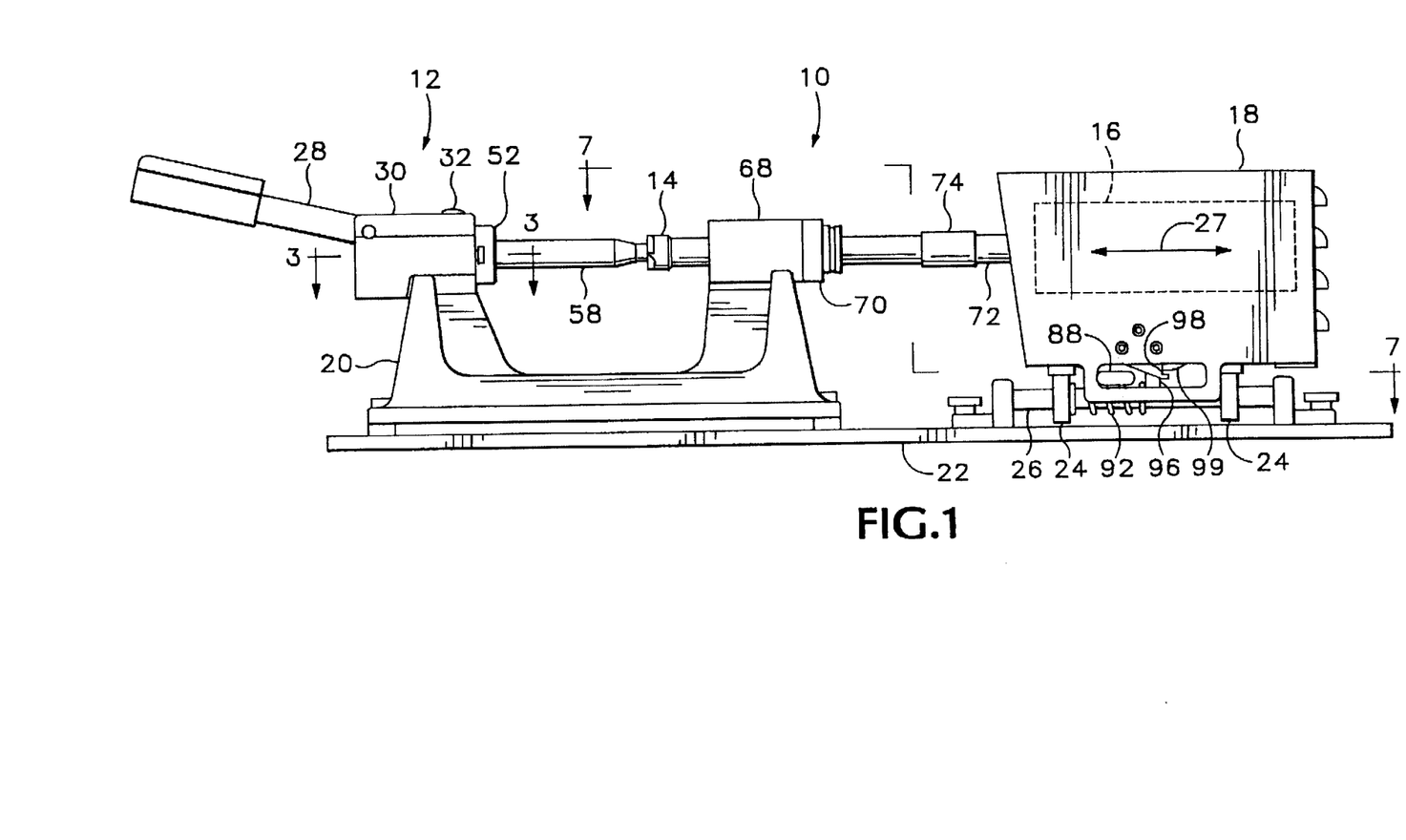
FIG. 1 is a side elevational view of a preferred embodiment of a case trimmer of the present invention.
Figure 2:
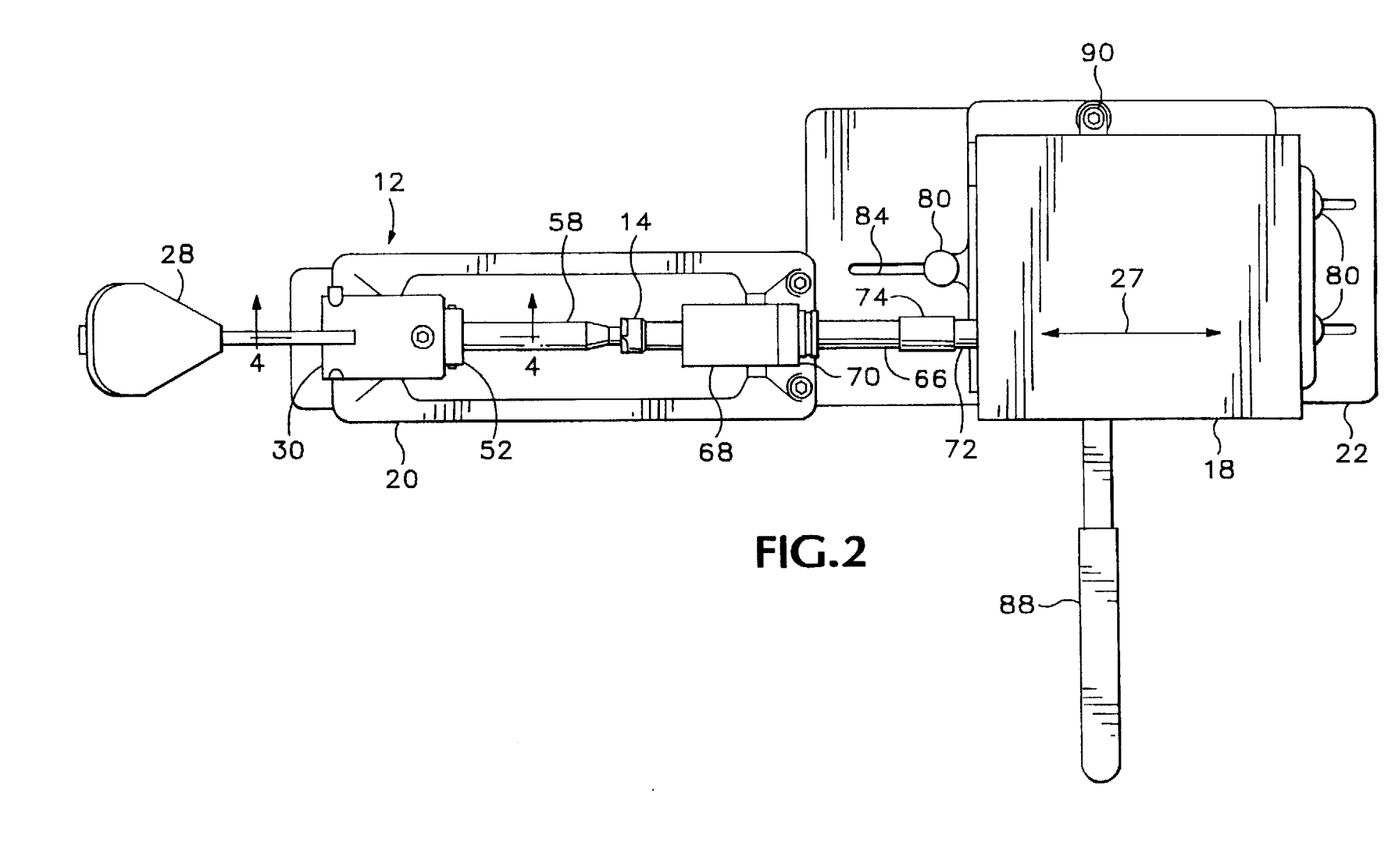
FIG. 2 is a top plan view of the preferred embodiment of the case trimmer shown in FIG. 1.
Figure 3:
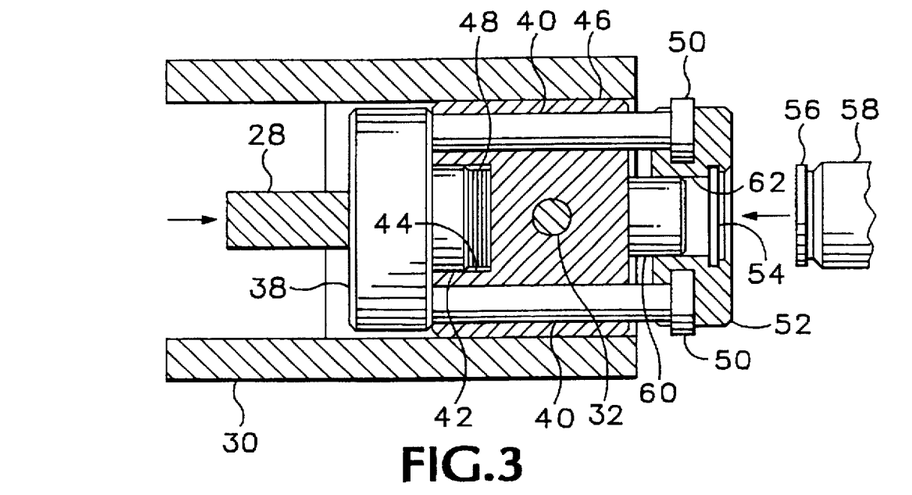
FIG. 3 is a partial, enlarged cross-sectional view taken along lines 3—3 in FIG. 1 showing a preferred embodiment of a case holder of the present invention wherein a receptacle is arranged to receive a cartridge case.

In FIGS. 1 and 2 there is shown a preferred embodiment of a case trimmer 10 of the present invention. The case trimmer 10 has a case holder 12, a cutting blade 14 and a motor 16 covered by motor housing 18. The case holder 12 and blade 14 are mounted on a base 20 which in turn is mounted on a platform 22. The motor and housing are attached to depending feet 24 which ride on a pair of parallel rails 26 thus allowing the motor to be moved back and forth along a longitudinal direction 27.

The case holder 12 has a padded lever 28 that is pivotally mounted to a lever support 30 which is bolted to the base 20 by a bolt 32. A lever pin 34 provides the pivotal connection between the lever 28 and the lever support 30.

Figure 4:
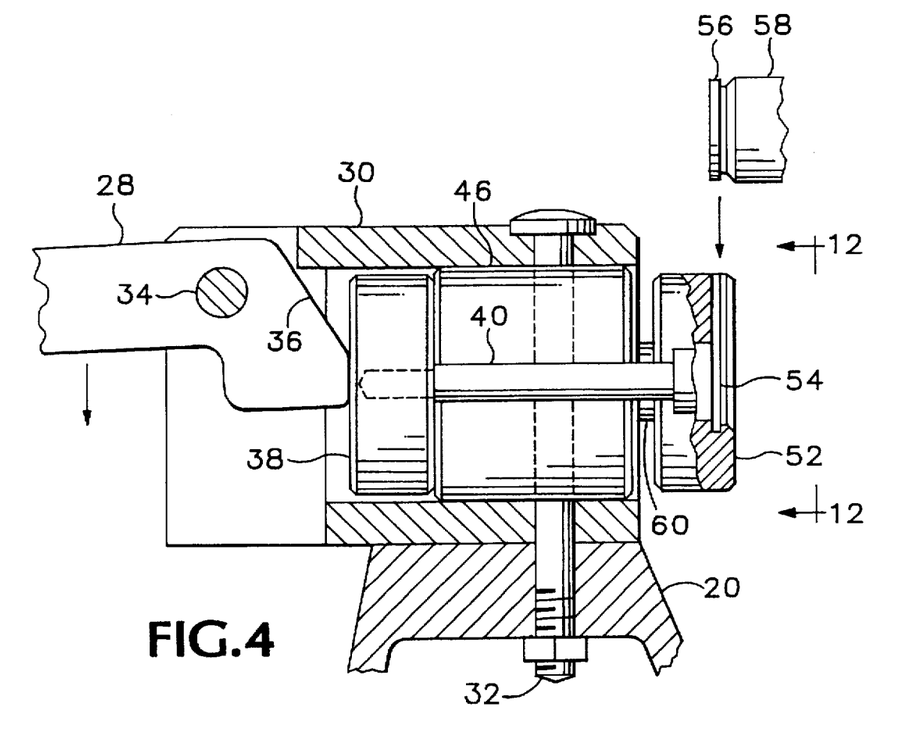
FIG. 4 is a partial, enlarged cross-sectional view taken along lines 4—4 in FIG. 2 showing a preferred embodiment of a case holder of the present invention wherein a receptacle is arranged to receive a cartridge case.
Figure 5:
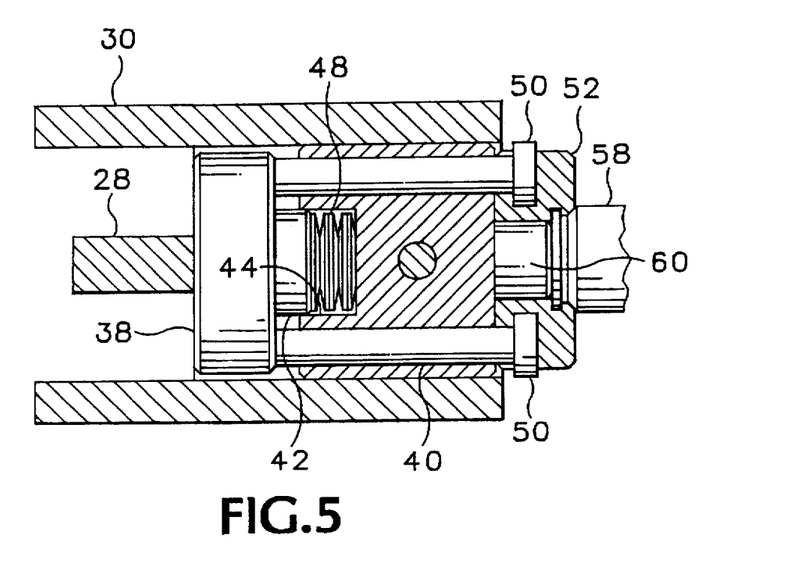
FIG. 5 is a partial, enlarged cross-sectional view taken along lines 3—3 in FIG. 1 of a preferred embodiment of a case holder of the present invention wherein a cartridge case is held in a receptacle.
Figure 6:
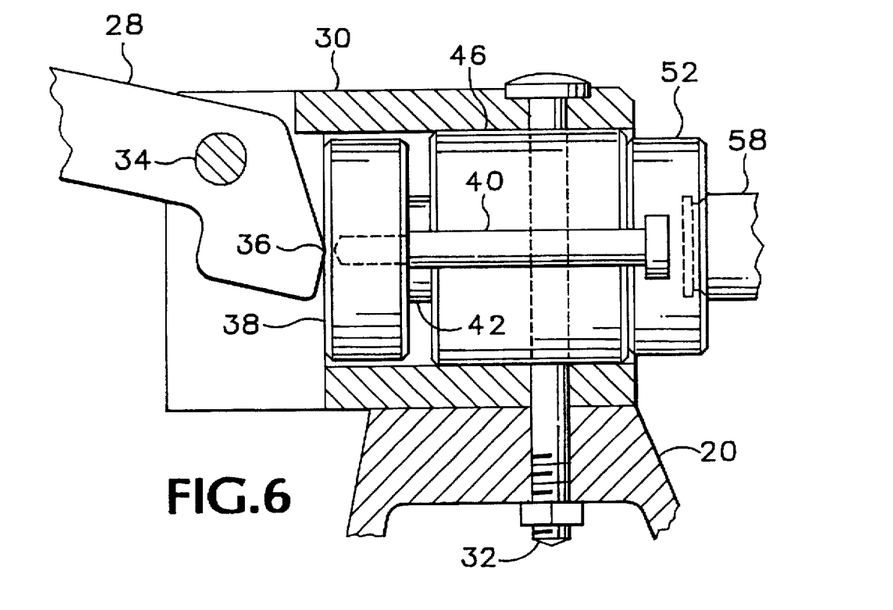
FIG. 6 is a partial, enlarged cross-sectional view taken along line 4—4 in FIG. 2 of a preferred embodiment of the case holder of the present invention wherein a cartridge case is held in a receptacle.

Various cross-sectional views of the case holder 12 are shown in FIGS. 3–6. In FIGS. 4 and 6 it can be seen that the lever 28 has a beveled surface 36, a portion of which can press against, and move, a compression head 38. A pair of activating rods 40 are fixedly attached to the compression head 38 for movement therewith. In addition, the compression head has a compression shaft 42 that rides within a recess 44 formed in a spring holder block 46. The block 46 is held stationary by bolt 32 which secures it to base A plurality of spring washers 48 are located within the recess 44 which engage the compression shaft 42 thereby urging it and compression head 38 to the left as viewed in FIGS. 3–6.

As mentioned, one set of ends of the actuating rods 40 are attached to the compression head 38. At their distal ends, the actuating rods are provided with heads 50 for attachment to a receptacle 52. Receptacle 52 is provided with a groove 54 for receiving a head 56 of a cartridge case 58. The groove 54 of the shell holder 52 provides a U-shaped opening having its open-end up so that the case 58 can be located at the top of the opening and slid downward to nest within the groove 54 as is diagrammatically illustrated in FIG. 4. The spring holder block 46 is further provided with a tenon 60 which is received in a bore 62 in receptacle 52 and is long enough to partially extend into the area defined by the groove 54.

With respect to FIGS. 3–6 the operation of the case holder 12 will now be explained. Beginning with an empty case holder 12, lever 28 is pressed downward rotating about lever pin 34 so that its beveled edge 36 presses against the compression head 38 thereby moving the compression head against the biasing force of the spring washers 48 and compressing the washers within the recess 44. The movement of the compression head moves the elongate actuating rods 40 in the longitudinal direction 27 thereby moving the receptacle 52 likewise in the longitudinal direction so that the receptacle moves away from the spring holder block 46. In this configuration, shown in FIGS. 3 and 4, the tenon 60 only partially fills the bore 62. The case 58 may now be positioned at the top of the U-shaped opening defined by groove 54 and slid downward into place where it will be aligned with the tenon 60.

After the case 58 has been inserted in the groove 54, the lever 28 can be released so it is no longer pushing against the compression head 38. With the lever pressure relieved, the spring washers 48 urge the compression head 38 to the left as viewed in FIGS. 3–6 which pulls the activating rods 40 through the spring holder block 46 thereby pulling the receptacle 52 towards the spring holder block 46. This movement of the receptacle causes the tenon 60 to fill the bore 62 until it contacts the end of the cartridge head 56. Continued pressure by the spring washers 48 provides a pressure on the tenon 60 against the end of the case 58 thereby holding it firmly in position.

Figure 12:
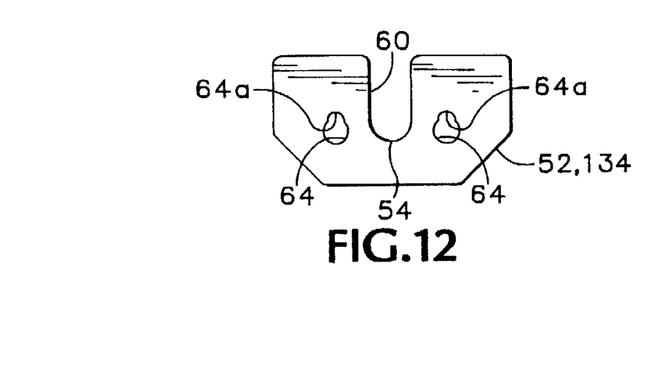
FIG. 12 is a front view of a cartridge receptacle taken along the line 12—12 in FIG. 4.

The receptacle 52 may be easily changed to provide a different receptacle 52 having alternatively configured grooves 54 for different configurations of cases 58. As shown in FIG. 12, the receptacle 52 is provided with keyhole openings 64 for receiving the heads 50 of the actuating rods 40. Narrow portions 64a of the openings 64 engage the shaft of the rods 40 thereby holding the receptacle in place.

Figure 13:
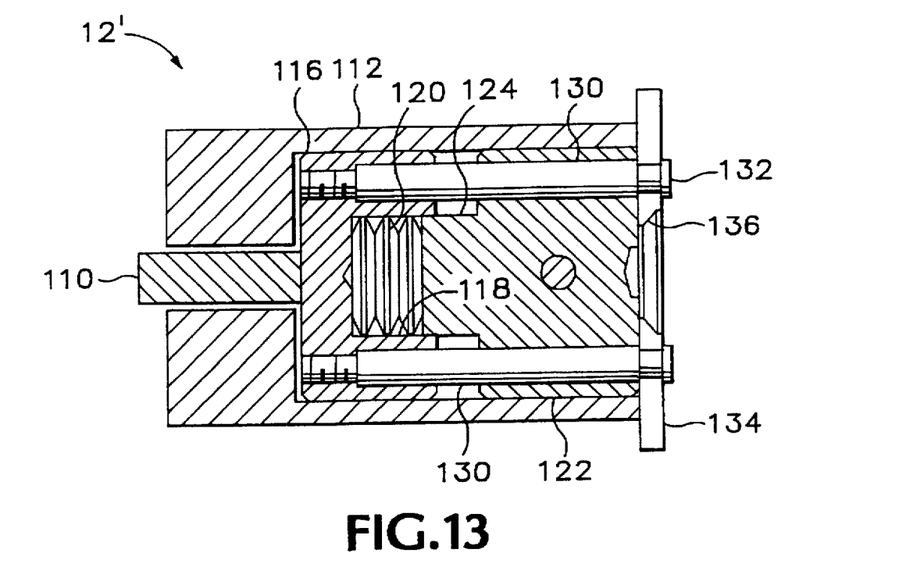
FIG. 13 is partial, enlarged cross-sectional plan view of an alternative embodiment of a case holder of the present invention.
Figure 14:
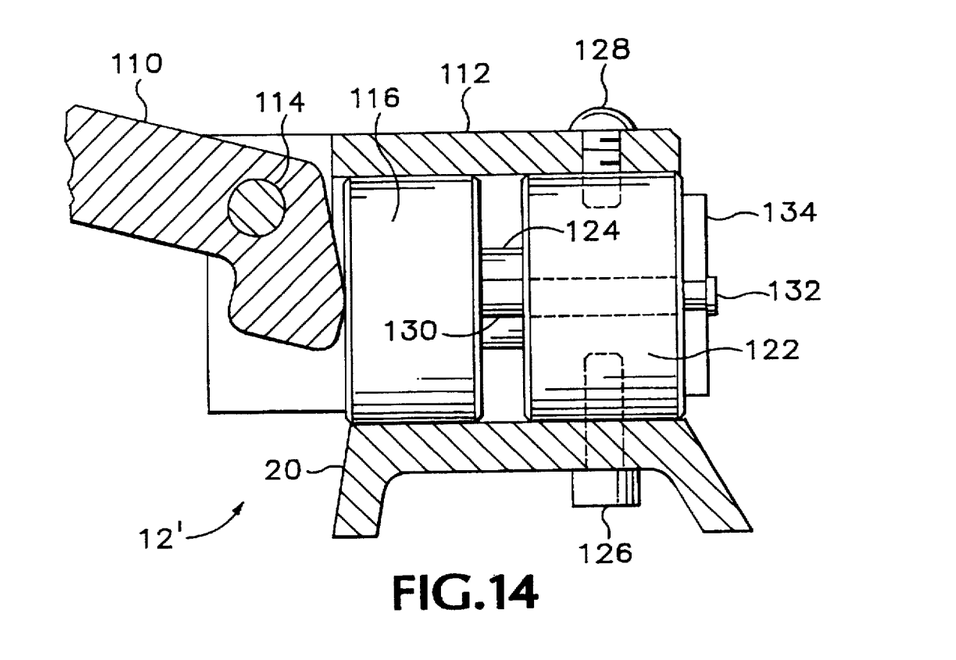
FIG. 14 is partial, enlarged cross-sectional elevation view of the alternative embodiment of FIG. 13.

A preferred embodiment of the case holder 12 is shown in FIGS. 13 and 14 as case holder 12'. In this embodiment, lever 110 is hingedly connected to a housing 112 by lever pin 114. The lever acts upon a compression block 116 having a recess 118 that receives spring washers 120 which are retained in the recess by a spring retention block 122. The block 122 has a raised retainer 124 that is received in the recess 118 so that it rides against the spring washers 120. The block 122 is fixed to the base 20 by a screw 126. Another screw 128 fastens the housing 112 to the block 122.

A pair of actuating rods 130 are threaded into the compression block 116. The rods 130 extend outward from the compression block 116 and pass through the spring retention block 122 and each terminates with a head 132. A receptacle 134 mounts onto the rods 130 and is held in place by the heads 132. Grooves 136 are provided in the receptacle for receiving the head 56 of the cartridge case 58.

The spring washers 120 urge the compression block to the left, as viewed in FIGS. 13 and 14, which likewise urges the rods 130 to the left. Thus, the receptacle 134 is urged against the spring retention block 122. Operationally, this alternative embodiment is functionally equivalent to the embodiment described above.

Figure 10:
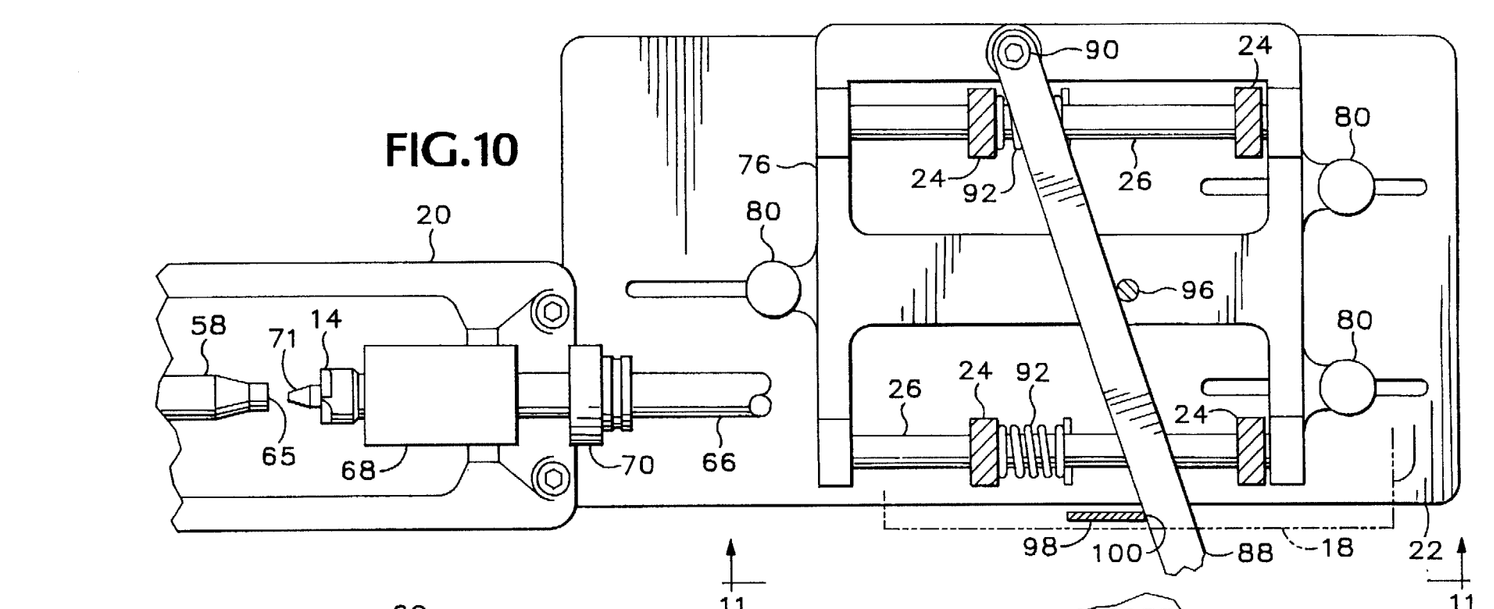
FIG. 10 is a partial cross-sectional view taken along lines 7—7 in FIG. 1 wherein a motor support is in a retracted and locked position.
Figure 11:
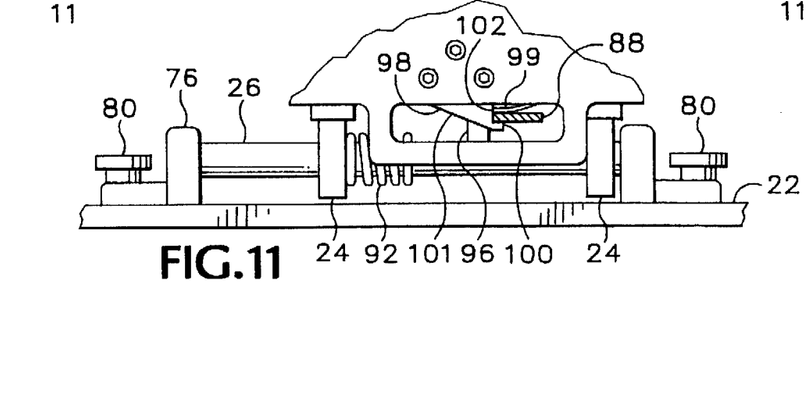
FIG. 11 is a partial elevational detail view of the motor support of FIG. 10 as viewed along line 11—11.

The mouth 65 of the case 58 (FIG. 10) is trimmed by the blade 14 which is mounted on, and rotates with, a rod 66. The rod 66 slides longitudinally and rotatably within a collar 68 that is fixedly mounted to the base 20. Rod 66 further supports an adjustable collar 70 that is used as a jig to set the depth of cut of the blade 14 into the mouth 65 of the case 58. A trimmer pilot 71 (FIG. 10) is centrally located on the blade 14 and slides into the mouth of the shell 58 during the trimming operation. A different pilot must be used for each different caliber of cartridge case.

The rod 66 is coupled to a drive shaft 72 of the motor 16 by a coupler 74.

Figure 8:
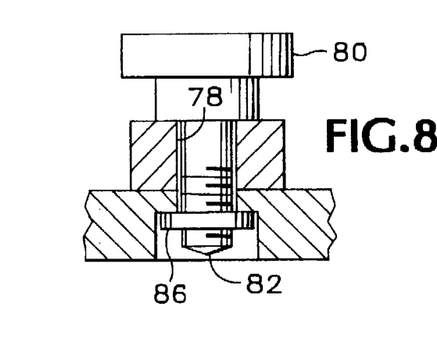
FIG. 8 is a partial, enlarged cross-sectional view taken along line 8—8 in FIG. 7.
Figure 9:
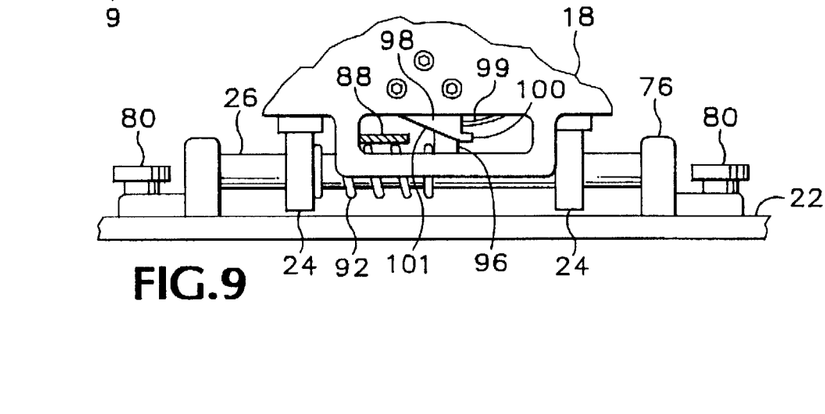
FIG. 9 is a partial, elevational detail view of a preferred embodiment of the present invention as viewed along line. 9—9 in FIG. 7.

As stated, the motor 16 and motor cover 18 are attached to a plurality of feet 24 which ride on a pair of rails 26. Springs 92 are located on the rails and are arranged to urge the motor toward the case holder 12 by pushing against shoulder pins 94. The rails are connected together by a frame 76 that is provided with bolt holes 78, as illustrated in FIG. 8. Locking bolts 80 extend through the bolt holes 78 and have threaded ends 82 that terminate within slots 84 formed in the platform 22. Nuts 86 screw onto the bolts 80 for securing the frame 76 and rails 26 to the platform 22. When the locking bolts 80 are loosened, the rails 26 and frame 76 are free to move longitudinally along the platform within the slots 84 so that the motor and blade may be adjustable longitudinally so that the case trimmer 10 can accept and trim cases 58 of different lengths.

Additionally, the amount of force of the blade 14 against the cartridge case 58 can be adjusted by moving the frame 76, together with the motor 16 and rails 26, along the slots 84. When the frame 76 and rails 26 are located furthest from the case holder then the springs 92 will be nearly extended when the blade 14 engages the cartridge case and the cutting force of the blade on the case will be a minimum. Conversely, when the frame and rails are located closest to the case holder 12 then the springs 92 will be nearly fully compressed when the blade engages the case and therefore the blade will exert a maximum amount of force on the case for maximum cutting per revolution of the blade.

Figure 7:
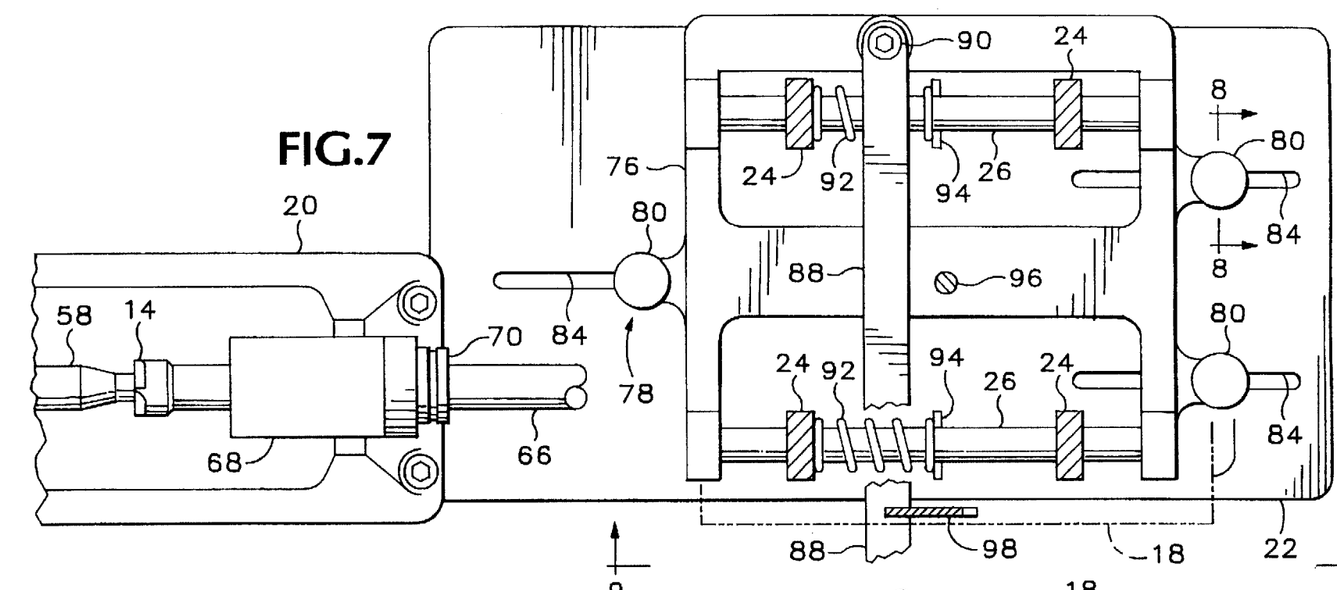
FIG. 7 is a partial, enlarged cross-sectional plan view taken along line 7—7 of FIG. 1 showing a preferred embodiment of the present invention.

Also located on the frame 76 is a handle 88 that is hingedly connected to the frame 76 by pivot 90. (See FIGS. 7 and 10.) Springs 92 are located on, and circumscribe, rails 26. A shoulder pin 94 is located on each rail 26 for maintaining the location of the springs 92 and for providing a fixed surface for the springs to press upon when they are compressed. The purpose of the springs 92 and motor handle 88 will be described below with respect to the movement of the motor 16 along the rails 26.

To an underside of the motor housing 18, there is secured a depending pin 96 and a handle lock 98 which move with the motor housing 18. A microswitch 99 is also provided and positioned so that when the handle 88 is engaged in the handle lock, the microswitch is depressed.

It is obvious that before a case 58 can be mounted in the case holder 12, the blade 14 must be retracted so that it is out of the way and does not interfere with the case as it is moved into position. This is accomplished by moving the motor 16 and housing 18 along the rails 26 with the handle 88. As can best be seen in FIGS. 1 and 7–11, handle 88 presses against the pin 96 such that when the handle is moved to the right as viewed in FIGS. 1 and 7–11, it pushes against the pin 96 and causes the motor 16 to ride along the rails 26 to the right, away from the case holder 12. Also, as the handle 88 moves to the right, it contacts and rides along a beveled surface 101 of the handle lock 98 until it reaches a distal end 100. Continued movement of handle 88 will cause it to slip past the distal end 100 where the handle 88 can come to rest in a recess 102. In this position, the motor is locked into position at a right-hand end of the rails 26 and the blade 14 is retracted away from the case holder 12 permitting room to load a case 58. Also, when the handle 88 is in the recess 102, it depresses the microswitch 99 opening an electrical circuit between a power source (not shown) and the motor thereby shutting the motor off.

After the case 58 has been inserted in the case holder 12, the handle 88 can be released from the handle lock 98 by moving it slightly to the right and downward so that it clears the distal end 100. When the handle leaves the recess 102 the microswitch 99 closes the motor circuit thereby turning the motor on. The springs 92 then urge the motor 16 to the left by pressing against a pair of the feet 24 as shown in the figures. The springs 92 thus move the motor 16 to the left until the blade 14 comes into contact with the mouth 65 of the case 58. During trimming, the blade 14 and motor 16 continue moving to the left under the urging of the springs 92 until the adjustable collar 70 comes into contact with the fixed collar 68 which prevents further motion to the left of the blade 14 and motor 16, at which time the trimming operation is complete and the motor and blade can be moved to the right by the motor handle 88. The case 58 can be removed from the case holder 12 by operation of lever 28 which again shifts receptacle 52 to the right to relieve the holding force on the case. The case trimmer 10 is then ready to accept another case for trimming.

In view of these and the wide variety of other embodiments to which the principals of the invention can be applied, the illustrated embodiments should be considered exemplary only and not as limiting the scope of the invention.

I claim as the invention all such modifications as may come within the scope and spirit of the following claims and equivalents thereto.

We claim:

1. A case holder for holding a cartridge case, comprising:
   (a) a lever support fixedly coupled to a base;
   (b) a first block slidably couple to the base;
   (c) a receptacle plate coupled to the first block for movement therewith, the receptacle plate defining a receptacle;
   (d) a second block fixedly coupled to the base located between the first block and the receptacle plate;
   (e) a biasing member urging the first block and the second block apart such that the receptacle plate is drawn toward said second block in response to said urging; and
   (f) a lever pivotally coupled to the lever support, said lever having a cam surface, such that pivoting of the lever in a first direction causes the cam surface to press against and move the first block against the urging of the biasing member toward the second block thereby moving the receptacle plate and the second block apart allowing a cartridge case to be inserted into said receptacle, and pivoting of said lever in a direction opposite to said first direction causes said biasing member to urge said first block and second block apart, and thus causes said receptacle plate to be moved toward said second block thereby causing said second block and receptacle plate to cooperate to hold a cartridge case located in said receptacle.

2. The case holder of claim 1 wherein the second block defines a recess and the biasing member is located in the recess and is coupled to the first block.

3. The case holder of claim 1 further comprising a rod coupled to the first block and the receptacle plate, which rod couples the first block to the receptacle plate, the rod passing through the second block.

4. The case holder of claim 1 further comprising two rods coupled to the first block and the receptacle plate, which rods couple the first block to the receptacle plate, the rods passing through the second block, the second block further comprising a recess located between the two rods and wherein the biasing member is located in the recess.

5. The case holder of claim 1 further comprising a rod coupling the first block to the receptacle plate and wherein the receptacle plate includes an opening that receives the rod so that the receptacle plate is selectively coupled to the rod.

6. The case holder of claim 5 wherein the rod has an enlarged head portion and the opening is a keyhole opening that receives the enlarge head portion.

7. A case holder for holding a cartridge case, comprising:
   (a) a lever support;
   (b) a first block;
   (c) a receptacle plate coupled to the first block for movement therewith, the receptacle plate defining a receptacle;
   (d) a second block located between said first block and said receptacle plate;
   (e) a biasing member for urging said first block and said second block apart such that said receptacle plate is drawn towards said second block in response to said urging; and
   (f) a lever having a cam surface; wherein said lever is pivotally coupled to said lever support such that pivoting of said lever in a first direction causes said cam surface to contact and move said first block against the urging of said biasing member and toward said second block, and thus causes said receptacle plate to be moved away from said second block thereby allowing a cartridge case to be inserted into said receptacle, and pivoting of said lever in a direction opposite to said first direction causes said biasing member to urge said first block and second block apart, and thus causes said receptacle plate to be moved toward said second block thereby causing said second block and receptacle plate to cooperate to hold a cartridge case located in said receptacle.

8. The case holder of claim 7 wherein the second block defines a recess and the biasing member is located in the recess.

9. The case holder of claim 7 further comprising a rod coupled to the first block and the receptacle plate, which rod couples the first block to the receptacle plate, the rod passing through the second block.

10. The case holder of claim 7 further comprising two rods coupled to the first block to the receptacle plate, which rods couple the first block and the receptacle plate, the rods passing through the second block, the second block further comprising a recess located between the two rods and wherein the biasing member is located in the recess.

11. The case holder of claim 7 further comprising a rod coupling the first block to the receptacle plate, and wherein the receptacle plate includes an opening that receives the rod, thereby selectively coupling the receptacle plate to the rod.

12. The case holder of claim 11 wherein the rod includes a head having a shoulder and the opening is a keyhole opening such that the keyhole opening defines a wide portion and a narrow portion and the wide portion accepts the head and the narrow portion fits over the rod and abuts the shoulder, thereby maintaining the receptacle plate coupled to the rod.

* * * * *

UNITED STATES PATENT AND TRADEMARK OFFICE
CERTIFICATE OF CORRECTION

PATENT NO. : 5,718,423
DATED : February 17, 1998
INVENTOR(S) : Blodgett et al.

It is certified that error appears in the above-identified patent and that said Letters Patent is hereby corrected as shown below:

Col. 1, line 13, "or" should read --of--.
Col. 1, line 17, "a-bullet" should read --a bullet--.
Col. 3, line 21, "base A" should read --base 20. A--.
Col. 4, line 60, "holder then" should read --holder 12, then--.
Col. 7, line 14, "plate," should read --plate--.
column 7, line 18, changing "and the receptacle plate" should read -- and the receptacle plate, --.
Col. 8, line 1, "block and the" should read --block to the--.
Col. 8, line 18, "rod, thereby" should read --rod thereby--.

Signed and Sealed this

Twenty-second Day of December, 1998

Attest:

BRUCE LEHMAN

*Attesting Officer*    *Commissioner of Patents and Trademarks*